United States Patent [19]
Fisher

[11] Patent Number: 5,384,671
[45] Date of Patent: Jan. 24, 1995

[54] PRML SAMPLED DATA CHANNEL SYNCHRONOUS SERVO DETECTOR

[75] Inventor: Kevin D. Fisher, Palo Alto, Calif.

[73] Assignee: Quantum Corporation, Milpitas, Calif.

[21] Appl. No.: 174,895

[22] Filed: Dec. 23, 1993

[51] Int. Cl.$^6$ ............................................. G11B 5/09
[52] U.S. Cl. ......................................... 360/51; 360/49
[58] Field of Search ............... 360/51, 46, 32, 77.08, 360/77.02, 77.04, 78.06, 78.08, 36.2, 40, 49

[56] References Cited

U.S. PATENT DOCUMENTS

| | | | |
|---|---|---|---|
| 4,941,154 | 7/1990 | Wei | 375/39 |
| 4,982,297 | 1/1991 | Tsujisawa | 360/77.08 X |
| 5,065,382 | 11/1991 | Seko et al. | 360/77.08 X |
| 5,170,299 | 12/1992 | Moon | 360/77.08 |
| 5,210,660 | 5/1993 | Hetzler | 360/77.08 X |
| 5,255,131 | 10/1993 | Coker et al. | 360/77.08 X |
| 5,255,136 | 10/1993 | Machado et al. | 360/77.02 |
| 5,258,933 | 11/1993 | Johnson et al. | 364/602 |
| 5,268,800 | 12/1993 | Nielsen | 360/77.05 X |
| 5,278,703 | 1/1994 | Rub et al. | 360/48 X |
| 5,285,330 | 2/1994 | Masaki | 360/77.08 |

*Primary Examiner*—Donald Hajec
*Assistant Examiner*—Thien Minh Le
*Attorney, Agent, or Firm*—David B. Harrison

[57] ABSTRACT

A synchronous servo data detection subsystem for a PRML sampled data channel of a hard disk drive including a plurality of radially extending servo sectors embedded on a rotating data storage surface. Each servo sector includes a servo synchronization field, a synchronous servo address mark field, and fields providing coarse and fine head position information. A data head reads and writes data signals from and to the storage surface, and a voice coil actuator structure positions the head at each selected data track under control of a head position servo loop. The sampled data channel receives, synchronously samples and decodes analog signals into digital data. and reads the servo fields as the data head passes over each servo sector. The servo detection system includes a timing loop for synchronizing the sampled data channel to the servo synchronization field to provide synchronous samples from the servo sector, a synchronous servo address mark pattern detector connected to an output of the sampled data channel for detecting the unique recording pattern and for thereupon generating a servo address mark found signal, a synchronous coarse head position information detector connected to an output of the sampled data channel responsive to the address mark found signal for detecting and accumulating coarse bits comprising the coarse head position information, and a synchronous fine head position detector connected to the sampled data channel for detecting the fine head position information. Preferably, the synchronous servo address mark pattern bears low correlation to the synchronization field and to the position information fields.

23 Claims, 6 Drawing Sheets

PRML SAMPLED DATA CHANNEL SYNCHRONOUS SERVO DETECTOR

FIELD OF THE INVENTION

The present invention relates to sampled data channels for use within magnetic data recording. More particularly, the present invention relates to a synchronous servo detection method and apparatus for use in a Class IV partial response, maximum likelihood (PRML) sampled data channel within a hard disk drive.

BACKGROUND OF THE INVENTION

Magnetic hard disk drives typically include one or more rotating magnetic data storage disks defining a multiplicity of concentric data tracks. Magnetic disk drives having high track and bit densities most frequently rely upon voice coil actuators for moving a selected data transducer (head) from a departure track to a destination track location during track seeking operations, for settling the head at the vicinity of the destination track during track settling operations, and for following the centerline of the destination track during track following operations when user data may be written or read from the disk.

Voice coil actuators are typically part of a head position servo loop. In one approach pertinent to the present invention, actual head position information is sampled by the head from the user data storage surface of the disk as the head passes over each one of a series of embedded servo sectors. A servo data detector circuit detects coarse head position information, digitally quantizes fine head position information, and sends the coarse and fine information to a servo controller, which may include a programmed disk drive microcontroller. A state model of the head positioner is developed in firmware, based upon the coarse and fine positional samples and commanded head position; and, driving currents are generated and applied to the voice coil to move the head in a highly controlled fashion.

It is known to arrange the concentric data tracks of a hard disk drive into contiguous data zones, wherein each zone is given a data transfer rate adapted to the innermost data track radius of the zone (the innermost track having the highest bit density at a constant data transfer rate throughout the zone). At the expense of circuit complexity of the read channel necessitated by changing clocking rates and read channel equalization with changes in zones, this approach significantly increases the data storage capacity, by recognizing that more storage space, and more data, is available in radially outer zones, than is available within inner zones. A track of an outer zone may typically include twice as much data as a track of an inner zone. Accordingly, the outermost zone may have a data transfer rate two times the data transfer rate of the innermost zone.

One presently preferred example of a hard disk drive architecture employing embedded head position servo and zone data recording techniques with constant frequency embedded servo sectors and split data fields is provided by commonly assigned U.S. Pat. No. 5,255,136, the disclosure thereof being incorporated herein by reference.

Advantages of using a PRML sampled data channel are known in connection with magnetic hard disk drives. One example of a disk drive architecture employing a PRML Class IV sampled data channel is described in commonly assigned, copending U.S. patent application Ser. No. 07/937,064 filed on Aug. 27, 1992, entitled: "Disk Drive Using PRML Class IV Sampling Data Detection with Digital Adaptive Equalization", the disclosure thereof being incorporated herein by reference. While the approach followed in this prior patent works satisfactorily, one drawback attending the described approach relates to the asynchronous, constant frequency embedded servo sectors.

In this prior patent, the servo information was recorded at a constant frequency across the radial extent of the drive, and was asynchronous with respect to the data fields which were coded to match a PR Class IV $(1-D^2)$ spectrum. Because the servo sectors were asynchronous with respect to user data, special digital peak detection circuitry was provided to detect and decode the servo information. Also, the analog filter equalizer, and the digital finite impulse response filter had to be retuned in real time at the arrival of each embedded servo sector, adding to the complexity of the design and control of the drive. Since the servo sectors were recorded at a constant frequency in accordance with the teachings of commonly asssigned U.S. Pat. No. 5,170,299, the disclosure thereof being incorporated herein by reference, considerable data storage space was lost, considering that the data tracks are arranged into concentric zones on the disk surface.

These drawbacks have resulted in a hitherto unsolved need for a synchronous sampled data channel servo data detection method and apparatus which is more compatible with the synchronous read channel architecture.

Summary of the Invention with Objects

One object of the present invention is to provide a synchronous sampled data channel embedded servo data pattern, servo pattern detection method and apparatus which uses the synchronous read channel in a manner overcoming limitations and drawbacks of the prior art.

One more object of the present invention is to provide a new embedded servo sector pattern for head positioning in a hard disk drive employing a partial response, maximum likelihood data channel in a manner in which the servo pattern is recorded in synchronism with user data so as to reduce servo sector overhead and thereby achieve greater servo data compaction embedded throughout the data storage areas of the disk.

Another object of the present invention is to make full use of the synchronous read channel for embedded sector servo signal processing as well as for user data processing.

Yet another object of the present invention is to provide an arrangement enabling zoned data recording techniques to be employed in a disk drive having embedded servo sectors without loss of, or reduction in, reliability of servo information during track seeking, track settling and track following operations of the disk drive.

A further object of the present invention is to provide a new Gray code track identification pattern for a hard disk drive employing embedded sector servo and a synchronous digital PRML read channel and to achieve a robust decoding of the new Gray code and provide built-in error detection.

One more object of the present invention is to provide a new servo address mark pattern for a hard disk drive which bears very low correlation with either a preceding preamble field or with a following Gray coded track or sector identification pattern within each servo sector.

Yet another object of the present invention is to provide a dual servo address mark scheme for an embedded sector servo disk drive including a coarse asynchronous servo address index mark for use during startup recalibration, and a more accurate synchronous servo sector address mark to mark the location in time of each servo sector and of a following Gray coded identification field during ongoing disk drive operations.

Still a further object of the present invention is to provide PLL buffer fields between synchronous servo burst fields to enable a resynchronization between servo bursts for more accurate sampling of burst amplitudes particularly during track settling operations of a hard disk drive when the head structure is settling at a destination track location following a track seeking operation.

Still one more object of the present invention is to provide new and simplified circuitry for synchronously decoding a servo address mark, a Gray code, and servo burst amplitudes within an embedded servo sector of a hard disk drive.

Yet another object of the present invention is to reduce electronics costs and design time required to implement an embedded sector servo scheme within a hard disk drive having a PRML synchronous digital data channel by elimination of separate channels for servo information and user data.

Still a further object of the present invention is to employ a single frequency for both user data and servo information within a disk data zone of a disk drive having a PRML synchronous digital data channel, and make use of existing PRML synchronous read channel circuits for decoding servo information as well as for recovering user data.

Yet one more object of the present invention is to decrease soft error rate for servo address mark and Gray coded identification information within embedded servo sectors of a disk drive having a PRML synchronous digital data channel.

One more object of the present invention is to improve the quality of detection of servo burst amplitudes and resultant head fine position information incorporated within servo sectors embedded amongst data blocks of a disk drive employing a PRML synchronous data channel.

Still one more object of the present invention is to eliminate dedicated circuitry within a PRML synchronous data channel of a disk drive which would otherwise be needed for digital or analog peak detection of servo burst amplitudes of bursts in embedded servo sectors.

Yet one more object of the present invention is to provide a servo pattern arrangement enabling prerecording of synchronous servo sector patterns by using existing servowriter technology.

These and other objects, advantages, aspects and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

Data Pattern on Data Storage Disk 16

Figure 1:
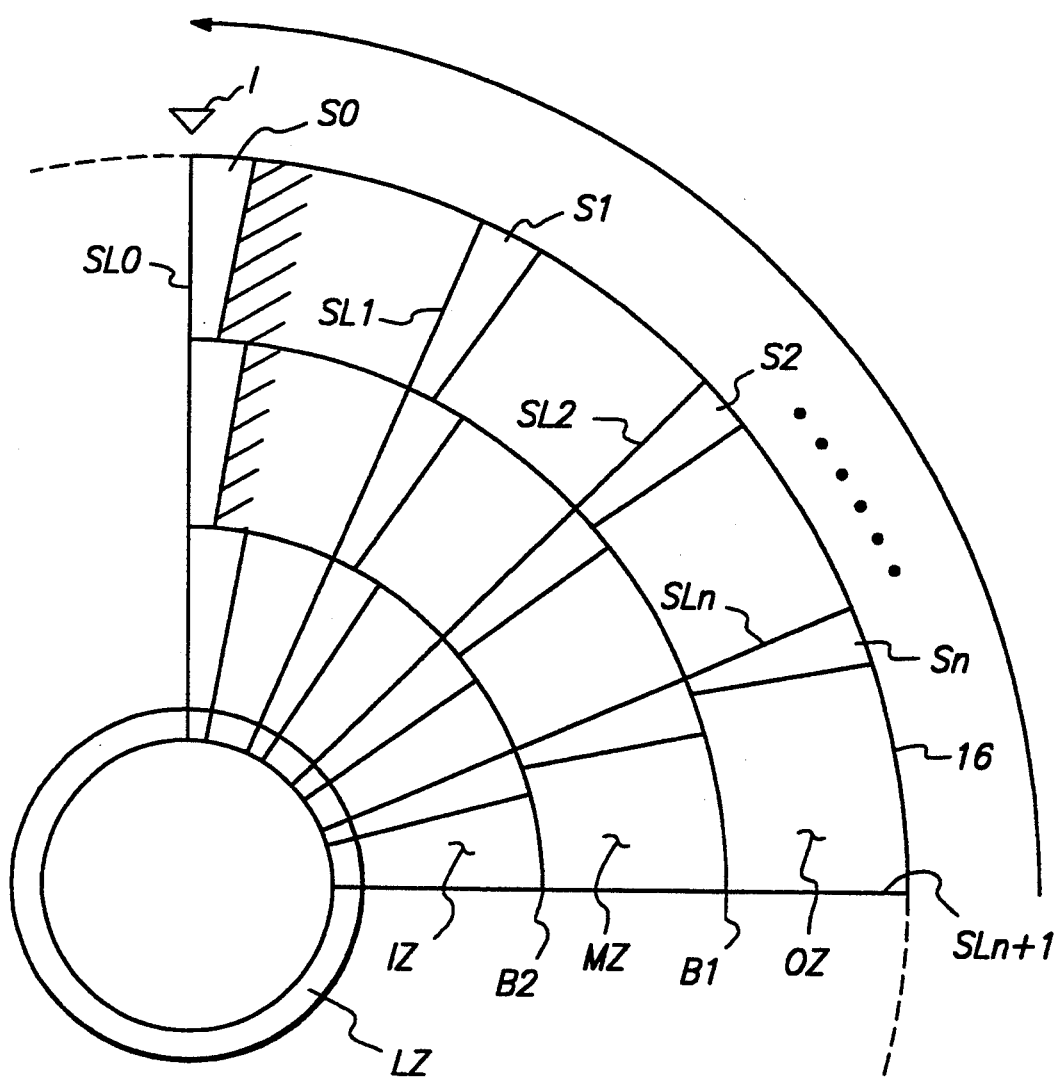
FIG. 1 is layout plan of a quadrant of a data storage disk incorporating a synchronous servo data pattern within a zoned data recording scheme in accordance with principles of the present invention.
Figure 4:
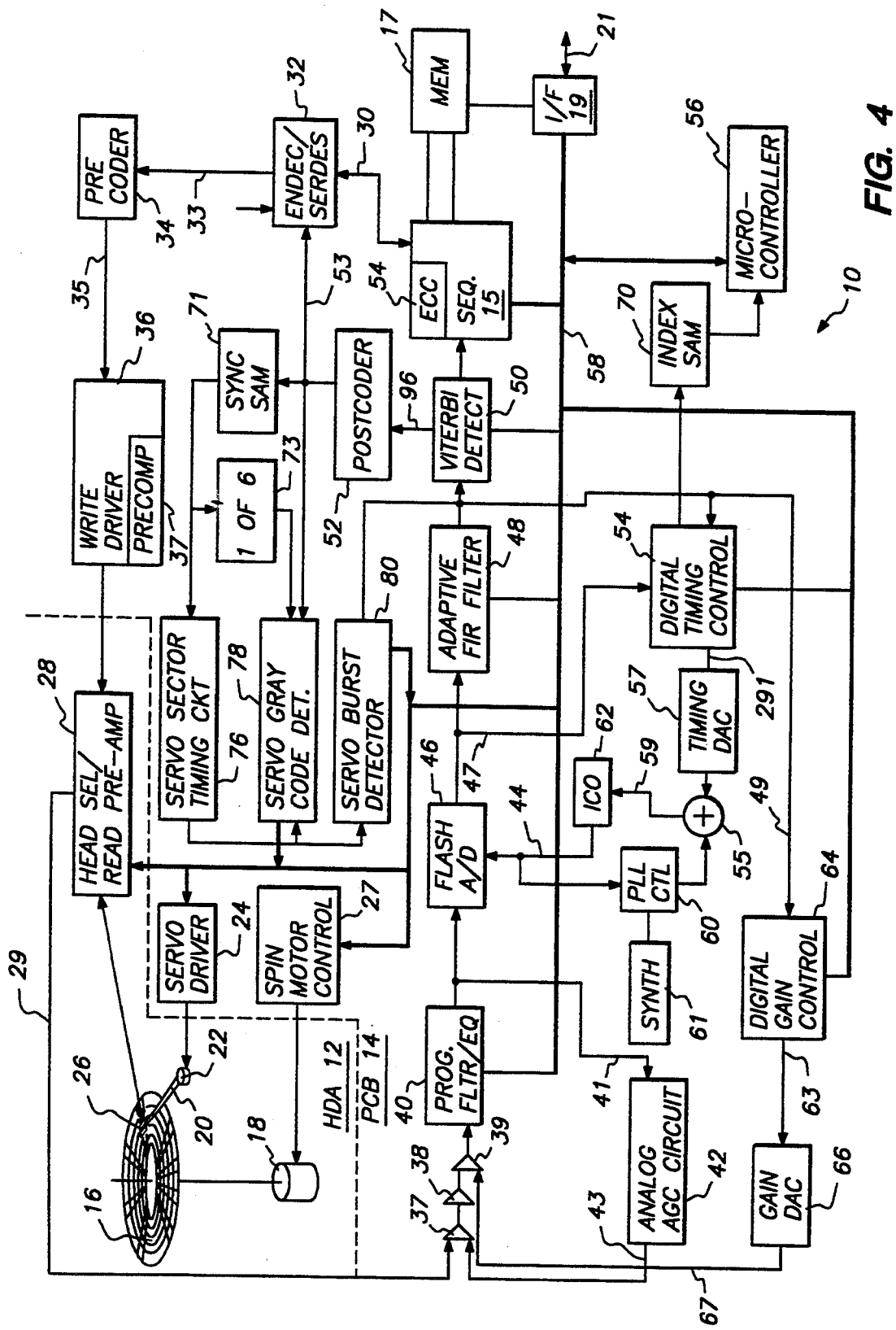
FIG. 4 is an overall block diagram of a hard disk drive incorporating a synchronous servo detection scheme in accordance with the FIG. 1 layout plan and in accordance with principles of the present invention.

With reference to FIGS. 1 and 4, a data storage disk 16 defines a multiplicity of concentric magnetic data storage tracks in which serial blocks of user data are sequentially recorded. In practice a hard disk drive may include up to eight or more data storage disks mounted in a stacked apart relation on a rotating disk spindle. The disk 16 is rotated at a predetermined constant angular velocity by a speed-regulated spindle motor 18 controlled by spindle motor control/driver circuitry 27. An e.g. in-line data transducer head stack assembly 20 is positioned e.g. by a rotary voice coil actuator 22 which is controlled by head position servo loop driver circuitry 24.

As is conventional, the data transducer head 26 of the head stack assembly 20 is associated in a "flying" relationship over a particular disk surface of each disk 16. The head stack assembly 20 thus positions e.g. thin film data transducer heads 26 relative to selected ones of a multiplicity of concentric data storage tracks defined on each storage surface of the rotating disk 16. While thin film heads formed on polished ceramic sliders are presently preferred for the heads 26, improvements in disk drive performance are also realized when other types of heads are employed in the disclosed PRML data channel, such as MiG heads or inductive write/magnetoresistive read head structures, for example.

The heads 26 are positioned in unison with each movement of the actuator and head stack assembly 20, and the resulting vertically aligned, circular data track locations across multiple data storage surfaces are frequently referred to as "cylinders" in the disk drive art. The storage disk is preferably of a small diameter, such as approximately 95 millimeters, or smaller, and it may be an aluminum alloy or glass disk which has been e.g. sputter-deposited with a suitable multi-layer magnetic thin film and a protecting carbon overcoat in conventional fashion, for example. Other disks and magnetic media may be employed, including plated media and, or spin-coated oxide media, as has been conventional in drives having lower data storage capacities and prime costs.

With reference specifically to FIG. 1, the data storage surface of each disk 16 is divided into three exemplary zones of concentric data tracks: an outer zone OZ, a middle zone MZ, and an inner zone IZ. An innermost landing zone LZ is also illustrated which is used in conventional fashion for contact stop/start recording. When the data storage disk 16 is rotated at a constant predetermined velocity, by using zoned data recording techniques, more optimum storage of data on the data disk 16 is achieved, with nominal data transfer rates for each zone being adapted to disk radius. While in the present example only three zones are illustrated, in practice as many as 16 or more data zones per data storage surface are preferred.

In practical terms a two times data clock difference may be realized between the data transfer rate at the outermost zone OZ and the data transfer rate at the innermost zone IZ. In the present example, the data written in tracks of the outer zone OZ may be written at a data clocking rate of 90 MHz. The data written in tracks of the middle zone MZ may be written at a data clocking rate of e.g. 66.67 MHz. And, completing this example, the data written in the tracks of the radially innermost data zone IZ may be written at a clocking rate of e.g 45 MHz.

Each zone may include as many as 100–200 or more concentric data tracks in which data blocks are broken up and divided into segments by a multiplicity of regularly spaced apart embedded servo sectors S, there being four such servo sectors S0, S1, S2 and Sn depicted in FIG. 1. Typically, there may be as many as 62 servo sectors (or more) defined on each data storage surface, depending upon the amount of head positioning servo information required by the head position servo loop in order to ensure reliable track following during data reading and writing operations.

In the data arrangement exemplified by FIG. 1, the disk 16 is rotated in a counterclockwise direction relative to the data transfer head. Importantly, in this example, all servo sectors thus begin at substantially continuous radial sector lines SL which are evenly spaced apart circumferentially around the disk 16. This sector line arrangement simplifies the timing required for locating and properly sampling the head position information included within each servo sector. Five such sector lines are shown in the FIG. 1 diagram: SL0, SL1, SL2, SLn and SLn+1. One of the sector lines e.g. SL0, marks the beginning (and end) of all of the circular data tracks and provides a once per revolution index marker I for marking a once-per-revolution index position of the rotating data storage disk 16 relative to a non-rotating data transducer head 26.

Because the head positioning information is recorded at the zone's nominal data transfer rate, there are discontinuous zone boundary regions located between adjacent data track zones including servo sectors. For example, a zone boundary B1 is between the outer zone OZ and the middle zone MZ; and, a zone boundary B2 is between the middle zone MZ and the inner zone IZ.

Another consequence of having the head position information in each servo sector S recorded at the same clocking rate as the user data of the particular zone is that the right edge of the radial boundary of the servo sectors manifests a somewhat "jagged" appearance, relative to the intervening user data regions within each zone. As is apparent in the FIG. 1 overview, circumferential offset exists between the servo sectors of the innermost track of each outer zone and the outermost track of each adjacent inner zone. In the presently preferred embodiment, the lengths of each of the servo sectors S of the innermost useable data tracks of all zones will have the same physical length on the disk. The disparity in servo sector lengths radially across the data surface and its consequence is explained in greater detail in connection with FIG. 3.

It is important to note in connection with FIG. 1 that during track seeking operations, the data sampling clock is reset by an embedded drive microcontroller 56 as the data transducer head 26 moves from one zone to the next. During the moment that the head is crossing a particular zone boundary B, servo position information is unavailable from the disk, and the servo loop is operating "open loop", based upon estimated parameters, such as position, radial velocity, and actuator driving current, which were derived from previous head position samples taken from the servo sectors and any other bias forces tending to affect head position while it is crossing the particular zone boundary.

By increasing the servo sector data rate to match the user data rate across the zones, it is apparent that a significant servo data compaction or reduction in storage area otherwise required by the embedded servo sectors S is achieved by having the servo clocking rate match each user data rate. This saving of disk space is relatively depicted in the shaded area to the left of the dashed line adjacent to servo sector SO in FIG. 1. Greater savings of disk storage area than shown in the FIG. 1 example may be realized in practice by employing a larger number of data zones than three.

An innermost landing zone LZ is also provided as a zone at which it is safe for the data transducer head 26 to come into contact with the delicate data storage surface of the disk 16. The inner landing zone LZ is fixed in part in relation to an inner rotational limit or "crash stop" which limits angular displacement of e.g. a rotary voice coil actuator structure 20 for positioning the head structure 26. In connection with FIG. 1, it should be noted that the servo sector patterns S are written into the landing zone LZ. In this manner, during drive initialization or recalibration, the head can be commanded "open loop" to be positioned against the inner crash stop and still read the servo sectors during initial flight of the head relative to the disk. Once the servo sectors are located, location and use of the synchronous servo information recorded within each servo sector thereby becomes practical, and the head may then be repositioned among the data zones as desired.

Figure 2A:
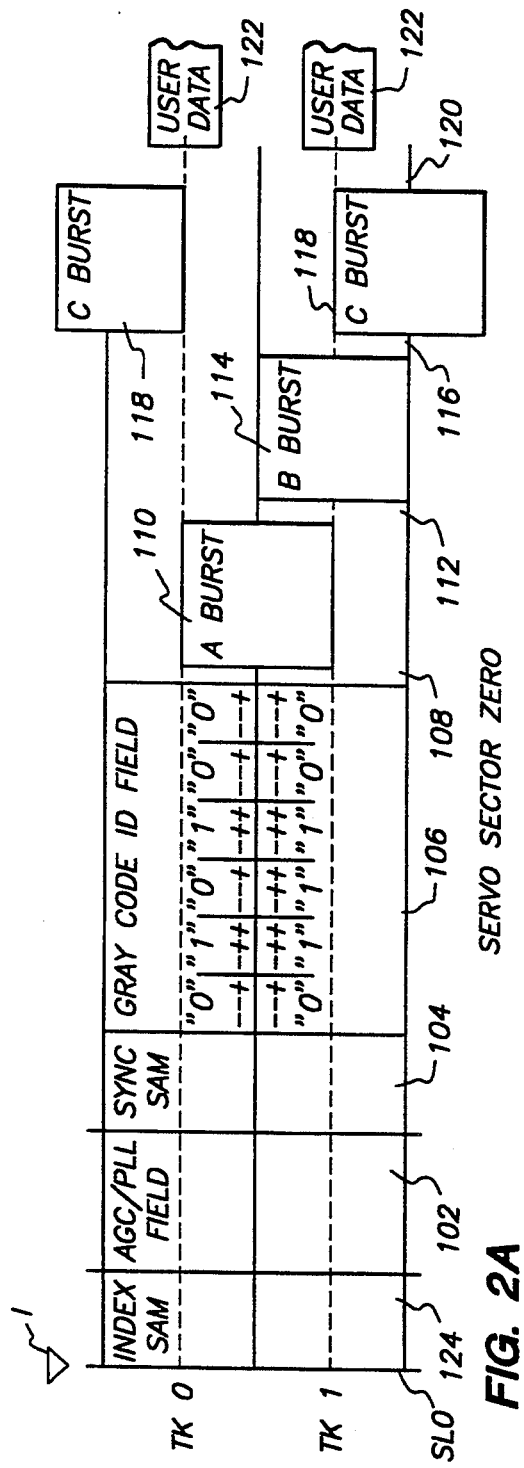
FIG. 2A–B is an enlarged, diagrammatic depiction of a servo wedge data structure within the FIG. 1 disk layout plan.
Figure 2B:
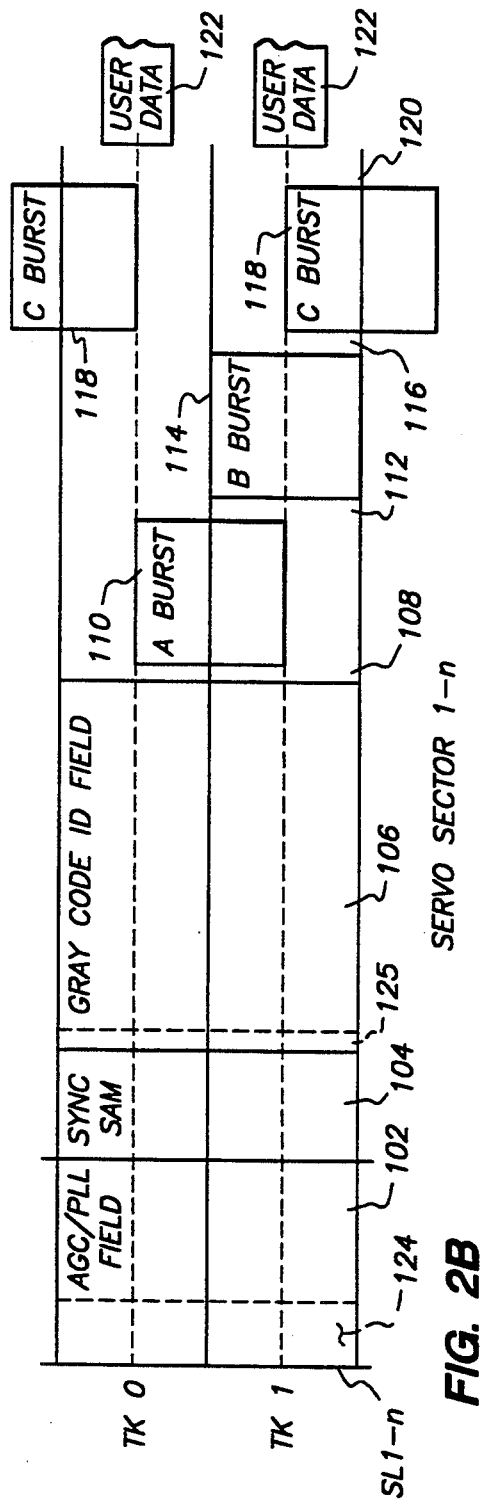

Synchronous Servo Sector Layout, FIGS. 2A and 2B

Referring now to FIG. 2A, a single servo sector location S0 at two adjacent data tracks, track 0 and track 1, of a particular data zone are shown. In this depiction, both tracks are shown to share an AGC/PLL field 102. In addition, each track includes a synchronous servo address mark field 104, a synchronous Gray coded track identification field 106, and adjacent tracks share three circumferentially staggered and radially offset constant frequency burst fields 108, 110, and 112 which are separated from themselves and other fields by guard fields 114, 116, 118 and 120. The user data field begins (or resumes) at field 122 following the servo sector S0. This first servo sector S0 also includes an asynchronous index servo address mark 124, so that the beginning of the data tracks may be detected from the disk surface during drive initialization and initial calibration, when the synchronous data channel is not yet synchronized to information on the data surface of the disk 16.

Ideally, the asynchronous index servo address mark pattern 124 includes several very long magnets which are quite unlike any other data patterns on the disk, and which may be readily detected by asynchronous operation of the data channel during initialization, so that a rough starting point for locating following servo sectors may be obtained. By placing the asynchronous servo pattern field 124 at the beginning of the AGC/PLL field 102 in the first sector S0, a space which is otherwise unuseable because of Barkhausen noise during normal data write/read operations becomes very useable and valuable during the initial power up sequence, when no data writing operations are being carried on at the drive 10.

FIG. 2B depicts sector location S 1, which is identical in length and layout as sector S0, except for the fact that the asynchronous index servo mark may optionally be eliminated in the AGC/PLL field 102. Sector S1 is representative of all of the servo sectors S, except for the first sector S0 which includes the asynchronous index servo address mark. Since the asynchronous servo mark field 124 is at the beginning of the AGC/PLL field 102 of the index sector S0, most, if not all, Barkhausen noise disturbances will occur in that particular region when the data head 26 transitions from writing to reading as the servo sector S0 is reached.

Since the index mark has been found during initial calibration, the presence of Barkhausen noise is not detrimental to ongoing servo operations.

It has been observed that long magnets or low frequency events tend to trigger impending Barkhausen noise events within the head structure. In light of this observance, an asynchronous servo mark field 124 may optionally be included in all of the servo sectors at the beginning of the AGC/PLL field, and an index bit added to the Gray coded track identification number field 106. In this alternative embodiment, the Gray code detector 78 also detects the once-per-revolution index bit and signals index found to the microcontroller 56, while the asynchronous SAM detector 70 detects each of the fields 124 during initial startup calibration, thereby reducing rotational latencies in first detection of a servo sector. FIG. 2B shows the asynchronous servo address mark field 124, and a Gray coded index bit position 125 in dashed lines.

From the vantage point of PRML, the AGC/PLL field 102 comprises a conventional ¼T sine wave pattern (which is the same as a 2 T pattern in a peak detect channel). Normally, for a PRML data channel, approximately 50 to 150 clock time cells ("T" intervals) will be provided for the AGC/PLL field 102. This length may be reduced somewhat by preloading a frequency offset term into the digital timing loop of the synchronous data channel, particularly since there is very little frequency variation from servo sector to servo sector (depending upon the accuracy of the servo writing process and spindle speed accuracy). Since the servo pattern is written by the servo writer at the factory only once, it is practical to implement a drive calibration routine which obtains and stores in memory frequency variations for each zone and within each zone. Thus, when the head arrives at a particular servo sector location, any frequency offset and rough gain setting will be known a priori and may be preloaded into the synchronous data channel to preset its characteristics to these particular characteristics of the servo sector then to be read.

The synchronous servo address mark pattern in the field 104 is selected on the basis of fault tolerance and minimum correlation with the AGC/PLL pattern 102, and with the encoding pattern of the Gray coded identification field 106. In the presently preferred approach, the AGC/PLL field comprises groups of four bits 1,1,1,1, before PRML Class IV precoding which are repeated at the highest data transfer rate. At the same time in the present approach, each decoded Gray code bit pattern comprises three non-return-to zero (NRZ) magnets, either 1,1,0, or 0,1,1, before PR4 precoding. The synchronous SAM pattern 104 is selected to have a minimum correlation (maximum Hamming distance) relative to the AGC/PLL ¼T pattern, and also to the Gray coded pattern coding convention (irrespective of the actual data values included within the Gray coded pattern).

One presently preferred example is as follows, with a binary bit stream in the top line, being written by the servo writer but analogous to the data stream at the precoder 34, and with NRZ encoding of this bit stream in the bottom line:

| 1111 1111 1111\|      | 000 0 1 1 0 0 0 1 1 0 0 0 0 0 0 1 1 \| | 011 110 011 110       |
|-----------------------|-----------------------------------------|------------------------|
| − − + + − − + + − − + + \| | + + + + − − − − − + + + + + + + − − \| | − + + − − − − + + − − − |
| AGC/PLL 102           | Synchronous SAM 104                     | Gray code 106          |

In this particular pattern the Hamming distance is ≧5 which implies that with a single error fault SAM detection tolerance, two errors in a servo sector could result in misdetection of the synchronous SAM pattern. With zero error fault tolerance, three errors would have to occur in the servo sector before a misdetection could occur. Other suitable synchronous SAM patterns may be identified with the aid of a computer directed search seeking low correlation patterns with the AGC/PLL field 102 and with the Gray coded identification field 106.

Since these fields 102, 104 and 106 are synchronously decoded in interleave fashion by the Viterbi detector 50 and passed through the postcoder 52 before reaching the synchronous SAM decoder 71, it is necessary that the synchronous SAM pattern be freely concatenable with the Gray code bits, meaning that each field ends with two magnets having the same polarity.

The servo sectors are written by a servo writer at the time of final assembly and checkout of the disk drive 10. Since the servo writer will not have detailed information relating to head/disk parameters, accurate write precompensation is nearly impossible. Therefore, the servo Gray coded identification patterns should avoid all dibit (or tribit) patterns in order to maximize the probability of correct detection by the Gray code detector 78. The Gray coding scheme described above advantageously will avoid dibits and tribits.

The PRML Viterbi decoder 50 works on an interleave basis. In order to understand decoder operation, it is essential that every other bit be considered. One bit set goes to one detector, while every other bit set goes to the other detector, within the interleave decoder 50. One of the detectors will see a 1,0 pattern or a 0,1 pattern, depending upon the pattern received. After each data pair is put out, a transition or merge bit (one) is also put out, meaning that all ambiguities otherwise remaining along the PRML trellis have now been resolved in the detector. This characteristic has the desirable effect of limiting error propagation.

Figure 3:
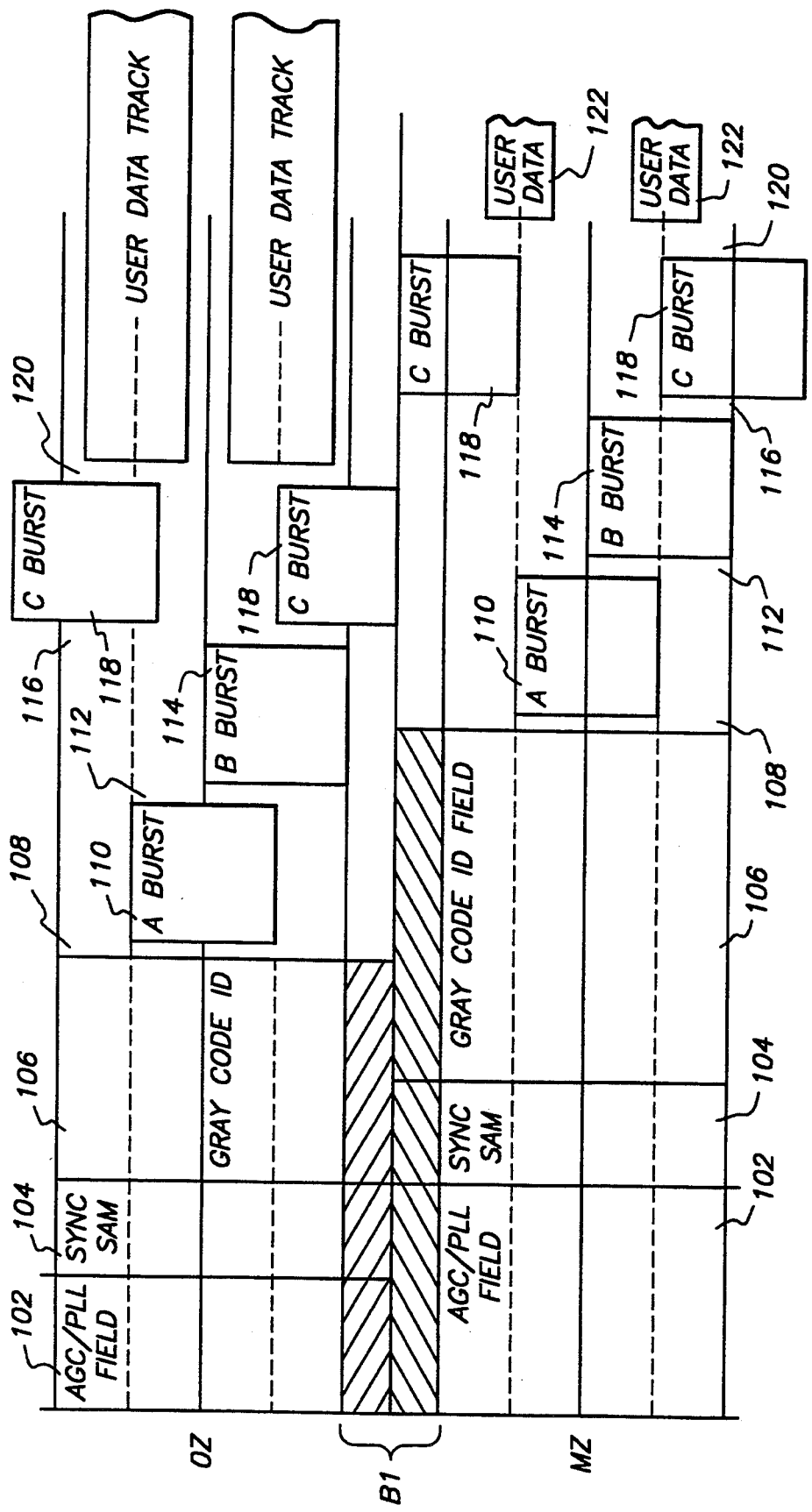
FIG. 3 is also an enlarged, diagrammatic depiction of a servo wedge data structure within the FIG. 1 disk layout plan at the vicinity of a boundary between two data zones having differing data transfer rates.

Data Zone Boundaries, FIG. 3

FIG. 3 illustrates the discontinuities in alignment of the servo fields at the boundary B between adjacent data zones. In the presently preferred embodiment, one data track location is sacrificed at each boundary, so that the servo fields from the generally aligned servo sectors of the adjacent boundaries may be written to the centerline of the boundary track, in order to provide margin for track following and data recovery. A data clocking rate discontinuity therefore runs along the centerline of the boundary track location, making it impossible for the timing loop of the synchronous read channel to acquire phase lock. The time required for the head to cross the boundary track during track seeking also provides a timing window during which the servo loop switches from the clocking rate of the departure zone and stabilizes at the clocking rate of the zone being entered. In FIG. 3 shading has been added across servo sector fields 102, 104 and 106, showing that these fields are recorded to the centerline of the boundary zone B1. The shading makes even more apparent the misalignment of servo fields of adjacent tracks at each zone boundary.

Disk Drive 10, FIG. 4

With reference to FIG. 4, an exemplary high performance, high data capacity, low cost disk drive 10 incorporating a programmable and adaptive PRML write/-read channel with synchronous servo detection in accordance with the principles of the present invention includes e.g. a head and disk assembly ("HDA") 12 and at least one electronics circuit board (PCB) 14. The HDA 12 may follow a wide variety of embodiments and sizes. One example of a suitable HDA is given in commonly assigned U.S. Pat. No. 5,027,241. Another suitable HDA is described in commonly assigned U.S. Pat. No. 4,669,004. Yet another suitable HDA is described in commonly assigned U.S. Pat. No. 5,084,791. Yet another HDA arrangement is illustrated in commonly assigned U.S. Pat. No. 5,255,136. The disclosures of these patents are incorporated herein by reference thereto.

A head select/read channel preamplifier 28 is preferably included within the HDA 12 in close proximity to the thin film heads 26 to reduce noise pickup. As is conventional, the preamplifier 28 is preferably mounted to, and connected by, a thin flexible plastic printed circuit substrate. A portion of the flexible plastic substrate extends exteriorly of the HDA 12 to provide electrical signal connections with the circuitry carried on the PCB 14.

The electronics PCB 14 physically supports and electrically connects the disk drive electronic circuitry needed for an intelligent interface disk drive subsystem, such as the drive 10. The electronics circuitry contained on the PCB 14 includes a data sequencer and cache buffer controller 15, a cache buffer memory array 17, a high level interface controller 19 implementing a bus level interface structure, such as SCSI II target, for communications over a bus 21 with a SCSI II host initiator adapter within a host computing machine (not shown).

A programmed digital microcontroller 56 includes a microbus control structure 58 for controlling data formatting and data transfer operations of the sequencer 15, data block transfer activities of the interface 23, head positioning of the rotary actuator structure 20 via a servo loop including the head 26, preamplifier 28 and synchronous data channel (in a manner explained hereinafter), and the servo driver 24. The microcontroller 56 also controls the spindle motor controller 27.

The synchronous data channel exemplified by FIG. 4 represents a rate 8/9ths implementation of a (0,4/4) code. In a (0,4/4) code, the minimum spacing between adjacent information one bits is a zero, the first four denotes the maximum number of consecutive zeros without a one in the encoded data stream, and the second four denotes the maximum number of consecutive zeros without a one in each interleave stream. In the present invention, the synchronous servo decoder follows the (0,4/4) coding convention (except for the unique, low correlation pattern provided in the synchronous SAM field 104), but it bypasses the rate 8/9ths coding convention imposed by an ENDEC/SERDES 32 of the synchronous data channel. This is because the rate 8/9ths code is byte-oriented, and the synchronous servo information is bit-oriented. The viterbi detector 50 path memory must be incrementally increased to have sufficient length to handle the unique pattern comprising the synchronous SAM.

The channel of FIG. 4 may conventionally include the read preamplifier 28, a data path 29 leading to a first variable gain amplifier 37, a buffer amplifier 38, a second variable gain amplifier 39, an analog programmable filter/equalizer 40, a flash analog to digital converter 46, a digital adaptive finite impulse response filter 48 a Viterbi detector 50, and a postcoder 52. A dual mode gain control loop, and a dual mode timing loop also provide important functions within the synchronous data channel. All of these elements together comprise a highly efficient, and presently preferred synchronous PRML data channel of a type described in the referenced, commonly assigned, copending U.S. patent application Ser. No. 07/937,064 entitled "Disk Drive Using PRML Class IV Sampling Data Detection with Digital Adaptive Equalization".

Alternatively, the synchronous data channel may be realized differently. In one different, yet entirely satisfactory approach, a sample and hold circuit receiving the incoming data stream from the head 26 may be followed by an analog magnitude FIR filter, followed by an amplitude digitizer, and then by a synchronous interleave detector and postcoder, etc.

In the synchronous data channel example provided by FIG. 4, during playback, magnetic flux transitions sensed by the selected data transducer head 26 are preamplified as an analog signal stream by the read preamplifier circuit 28. The preamplified analog signal stream is then sent through the path 29, the analog variable gain amplifier (VGA) 37, the fixed gain amplifier 38, and the second VGA 39. After controlled amplification, the analog signal stream is then passed through a programmable analog filter/equalizer stage 40. The analog filter/equalizer 40 is programmed so that it is optimized for the data transfer rate of the selected data zone from within which the transducer head 26 is reading data. The equalized analog read signal is then subjected to sampling and quantization within a high speed flash analog to digital (A/D) converter 46 which, when synchronized to user data, generates raw digital data samples $\{x_k\}$. The A/D 46 is provided with a suitable resolution, which is at least six bits, and more preferably, eight bits per sample $\{x_k\}$.

In the FIG. 1 example, during non-read times, an analog automatic gain control circuit 42 has an input path 41 from the output of the analog filter/equalizer 40, and it develops and feeds an error voltage to a control input of the VGA 37 over a control path 43. During read times, a digital gain control value from a digital gain control circuit 64 is converted into an analog value by a gain DAC 66 and applied over a path to control the second VGA 39, while the analog error voltage on the path 43 is held constant. The digital gain control circuit 64 develops its gain control values from conditioned data samples put out by the digital FIR filter 48 over a path 49. Details of the gain control circuit are provided in commonly assigned U.S. patent application Ser. No. 07/986,742, filed on Aug. 27, 1992, the disclosure thereof being incorporated herein by reference. Other automatic gain control approaches may be followed in practicing the present invention.

The FIR filter 48 employs adaptive filter coefficients for filtering and conditioning the raw data samples $\{x_k\}$ in accordance e.g. with desired PR4 channel response characteristics in order to produce filtered and conditioned samples $\{y_k\}$. The bandpass filtered and conditioned data samples $\{y_k\}$ leaving the filter 48 are then passed over the path 49 to the Viterbi detector 50 which decodes the data stream, based upon the Viterbi maximum likelihood algorithm employing a lattice pipeline structure implementing a trellis state decoder, for example. At this stage, the decoded data put out on a path 96 is passed through a postcoder 52 which restores the original binary data values.

During user data block reading operations from the user data storage regions of the disk 16, the binary data values are deserialized by the ENDEC 32 which frames and puts out eight bit user bytes in accordance with an inverse of the 8/9ths rate coding convention (nine code bits for every eight user data bits). The ENDEC/SERDES may be in accordance with commonly assigned U.S. Pat. No. 5,260,703. The decoded user bytes are then passed to the sequencer 15 over the data path 30, and handled thereafter conventionally, in accordance with the methods explained in commonly assigned U.S. Pat. No. 5,255,136, referred to above.

In order for the present system to work properly, the raw data samples $\{x_k\}$ must be taken on the incoming analog signal waveform at precisely proper, regular locations. Accordingly, the dual mode timing loop is preferably provided to control the frequency and phase of the flash analog to digital converter 46. The timing loop includes an analog timing control circuit 60, and a digital timing control circuit 54 and a timing DAC 57. A timing phase locked synthesizer circuit 61 supplies synthesized timing signals to the control circuit 60 and a timing reference signal to a summing junction 58. A sum put out by the summing junction 58 controls a current controlled oscillator 62 in order to clock the A/D 46. The oscillator 62 also includes zero phase start circuitry to provide controlled startup at an approximately correct phase with the incoming data samples. The timing loop is described in commonly assigned U.S. Pat. No. 5,258,933, the disclosure thereof being incorporated herein by reference.

The digital timing loop (and the digital gain loop) includes a threshold circuit for determining thresholds at −2, 0, and +2, and produces a $\hat{y}_k$ value. Accordingly, the timing threshold circuit also functions as the asynchronous SAM detector 70 during calibration, and provides the control over the path 55 to the microcontroller, based on a string $\hat{y}_k$ values indicative of the presence of the long magnet 14T index SAM pattern.

Use of a digital gain control loop and a digital timing control loop has a number of advantages. First, a gain (and timing) control loop controlled via digital samples is less sensitive to variations in temperature, power supply and component tolerances than is a strictly analog control loop. Second, loop compensation or bandwidth may be easily adjusted or varied simply by loading registers, or by switching between banks of registers for "on the fly" changes. This means that optimal loop compensation may be used during both acquisition and tracking modes. Finally, the digital loop filter eliminates errors otherwise due to bias and offset that may exist in an analog-only loop filter implementation.

The servo fields 102, 104, 106, 110, 114, 118 and 124 are written following drive assembly and checkout at the factory by a servo writer apparatus. Embedded servo fields may be written by a servo writer, preferably in accordance with the methods described in a commonly assigned U.S. Pat. No. 5,170,299, entitled "Edge Servo For Disk Drive Head positioner, the disclosure thereof being hereby incorporated by reference.

On the other hand, writing user data to disk requires a write channel. The write channel includes the ENDEC/SERDES 32, a precoder 34, a write driver 36 including a write precompensation circuit, and the frequency synthesizer 61 within the timing loop. The frequency synthesizer 61 includes an internal current controlled oscillator and a synthesizer DAC which enables firmware selection by the microcontroller 56 of programmable range-centered frequencies which are selected to approximate the frequency of each data zone. Thus, as each data zone is reached during track seeking, the synthesizer 61 is preset to the nominal data clock rate for the new zone and that coarse timing setting will be applied to the timing summing junction 55. While the frequency synthesizer 61 changes clocking rate for each zone, to simplify timing, the drive microcontroller 56 is clocked at a constant data frequency irrespective of zone. Thus, the microprocessor's clock cycle is independent of the zone data rate, and overall drive control is not lost during a data zone transition by the head 26.

The output from the synthesizer 61 comprises a write clock signal used to control user data transfer clock rate during data writing operations to the disk 16. The write clock signal is applied to the write precompensator circuit 37 within the write driver circuit 36. The write precompensator circuit 37 accepts encoded NRZ user data to be written to the data storage disk 16 from the precoder 34, and adjusts the relative phase of this data in order to carry out precompensation relative to the write clock signal. Application of precompensation delay causes the affected bit to be written to be delayed by the percentage amount with respect to nominal T cell timing established by the write clock signal. The write clock signal is also applied to the timing DAC 57 and to the AGC DAC 66.

Once an AGC/PLL field 102 is reached within a servo sector, the digital timing control 54 will quickly acquire synchronous timing based upon the data samples (raw data samples during timing acquisition, and conditioned data samples thereafter), and a fine timing adjustment value will be applied via the timing DAC 57 to the timing summing junction 55. The sum reached by the timing summing junction 55 is then applied to control a current controlled oscillator 62 which in turn clocks the flash A/D 46 in the synchronous data channel.

During read times, the timing DAC 57 is active, and the output from a timing loop low pass filter of the PLL control circuit 60 is held as a static offset. During non-read times, the analog PLL control circuit 60 is active in regulating the timing loop oscillator 62. By summing all of the phase offsets into the summing junction 55, the dynamic range required of the timing DAC 57 is thereby reduced.

The index SAM preferably comprises e.g. a 14T DC erase gap. Accordingly, the disk drive 10 includes an asynchronous index SAM decoder 70 connected to the output 53 of the postcoder in order to detect the presence of the 14T DC erase gap within the binary data stream. The 14T DC erase long magnet pattern comprising the asynchronous index SAM may be readily decoded by passing the decoded binary data stream through a shift register having e.g. 12 stages set to detect all zeros in the pattern, and combinatorial logic connected to each stage to test its latched state.

Detection of an index SAM occurs only during a power-on calibration routine. When the index SAM pattern matches the pattern programmed into the asynchronous SAM detector logic 70, the index SAM found signal is asserted. The microprocessor 56 proceeds with initial calibration by starting a servo sector timing circuit 76 which is used to establish timing windows for the servo sectors. Once the servo sectors are located, a process of synchronizing the read channel to the disk data begins by reading the AGC/PLL field of each servo sector. This enables decoding of the synchronous SAM and the Gray coded coarse head positioning information. Once this information is available to the microprocessor 56, it may command seeks to desired track locations, and continue with the initialization process. After the index SAM is located during the initial calibration routine, the output from the index SAM is unnecessary, as the servo sector timing circuit 76 marks the index sector in time. In the event that spin-down occurs during a power saving mode, or in the event of a spindle speed error, are calibration routine is invoked, and once again, the index SAM(s) are located, thereby to locate at least one servo sector and begin head positioning and recovery of the data from the disk 16.

A synchronous servo decoder 71 is also connected to the synchronous data channel e.g. at the postcoder output 53 and decodes the synchronous servo SAM field 104. In order for the Viterbi decoder 50 to decode the synchronous SAM pattern, it must be equipped to handle the longest magnet on an interleave basis. In the synchronous SAM example given above, the maximum magnet length is five clock periods, so at least one interleave detector within the Viterbi decoder 50 must have six stages. The synchronous SAM decoder 71 comprises simple pattern recognition logic which recognizes the unique synchronous SAM pattern within the post coded (decoded) data stream. The SAM decoder 71 may be provided with fixed or programmable fault tolerance in detecting the synchronous SAM pattern, as explained above.

Upon detection of each servo SAM in the field 104, a signal resynchronizes a sector interval timer within a servo sector timing circuit 76. The timing circuit provides timing signals via an output path 77 to control a servo Gray code decoder circuit 78 and a servo burst amplitude detector circuit 80. A one-of-six circuit 73 is also connected to the postcoder output and determines proper interleave timing for the servo Gray code decoder 78.

Within the synchronous data channel, the microcontroller 56 controls a programmable analog filter/equalizer 40, an adaptive FIR filter 48, a Viterbi detector 50, a digital timing control 54, and a digital gain control 64. The micro-controller 56 is provided with direct access to the DRAM memory 21 via the sequencer/memory controller 19 and may also include internal and/or external program memory, as may be required or desired.

For user data, a bi-directional user data path 30 connects the data sequencer and memory controller 15 to an encoder/decoder ("ENDEC") 32 within the synchronous data channel. The ENDEC 32 also provides the functions of a serializer/deserializer ("SERDES"). The ENDEC 32 is most preferably in accordance with the teachings of commonly assigned U.S. Pat. No. 5,260,703, the disclosure thereof being incorporated herein by reference. This circuit 32 is not used by the synchronous servo detector of the present invention.

In this preferred embodiment, the ENDEC 32 converts the binary digital byte stream into e.g. 8/9ths rate coded data sequences in accordance with a predetermined data coding format. This coded serial data stream is then delivered over a path 33 to a precoder 34 which precodes the data in accordance with the PR4 precoding algorithm $1/(1 \oplus D^2)$ in accordance with the (0,4/4) code constraints. The precoded data is then passed over a path 35 to a write driver circuit 36 wherein it is precompensated by the write precompensation circuit 37 and is then delivered to the selected data transducer head 26 via a head select function within the circuit 28. The head 26 thereupon writes the data as a pattern of alternating flux transitions within a selected data track on a selected data storage surface of the disk 16.

Figure 5:
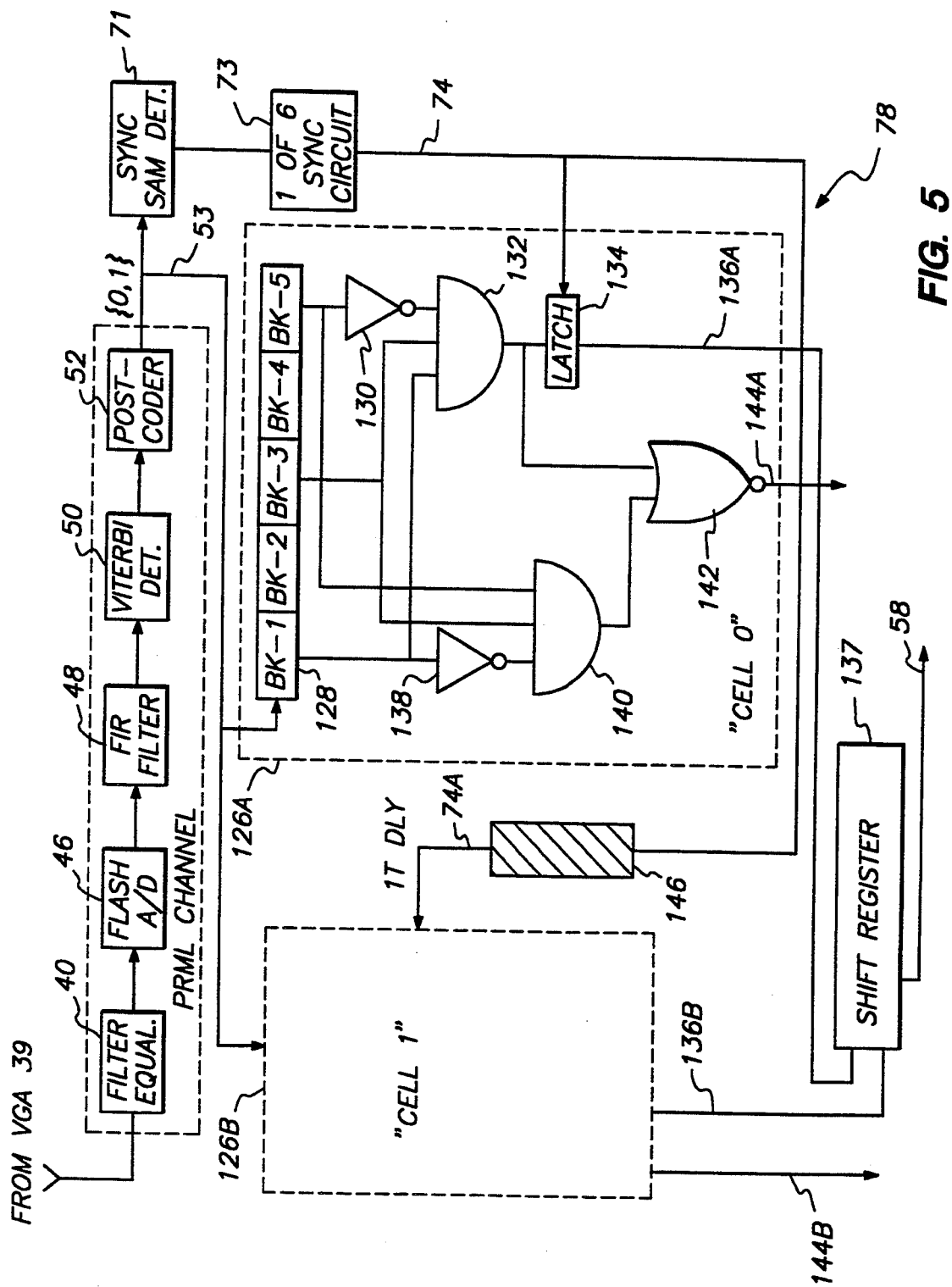
FIG. 5 is a more detailed block diagram illustrating a synchronous Gray code detector in accordance with principles of the present invention.

Remembering that the synchronous data channel detector 50 detects bits on the basis of a two-to-one interleave, the FIG. 5 synchronous Gray code decoder 78 includes two identical hardware detectors, a "cell 0" decoder 126A for detecting the Gray coded bits of one interleave, and a "cell 1" decoder 126B for detecting the Gray coded bits of the other interleave. Since the detectors 126A and 126B are identical, only the cell 0 detector 126A will be described in detail.

The decoded, interleaved bits on the path 53 from the postcoder 52 enter a shift register 128. This register 128 is clocked at the zone clock rate T, and it defines five stages: bk-1, bk-2, bk-3, bk-4, and bk-5. Every other stage: bk-1, bk-3 and bk-5 is of interest, and the stages bk-2 and bk-4 are essentially place holders. An output from the stage bk-5 is inverted by an inverter 130 and then passed as one input to a three input AND gate 132. The outputs from the other stages bk-1 and bk-3 provide the other two inputs to the AND gate 132. If the input bit pattern at the AND gate 132 is 0, 1, 1, (bk-5, bk-3, and bk-1) a Gray coded one bit is found. Otherwise, a zero bit is deemed present. The output state of the AND gate 132 is latched into a latch 134 in accordance with a latching signal provided by the one of six circuit 73. This circuit responds to the synchronous SAM found signal put out by the synchronous SAM detector 71 to begin a counting interval of six T cells. At the sixth T cell of six series, the one-of-six circuit 73 puts out a logical true level, which causes the latch 134 to latch the state of the AND gate 132. At this time interval, the interleave Gray coded bit pattern in the register 128 should be valid, and either a Gray coded bit pattern for a one bit (0, 1, 1) or a zero bit (1, 1,0) will be present in the latch 132. An output line 136A transfers the detected bit into a shift register 137 clocked at the Gray coded bit rate. After the bits comprising the Gray coded identification field are shifted into the register, they are read out in parallel to the microcontroller 56 over the bus structure 58.

However, if the head is located between tracks, the Gray coded identification field of a particular track may not be able to be read accurately, and the values read may be error conditions, such as 1,1,1, or 1,0,1, or 0, 1, 0. Accordingly, additional logic is provided within the interleave detectors 126 to determine whether a valid zero Gray code bit pattern is present (when a one bit is not present). This circuitry includes an inverter stage 138 connected between the output of the shift register stage bk-1 and another AND gate 140. The other two inputs to the AND gate 140 are provided directly from the outputs of stages bk-3 and bk-5 of the shift register 128. Thus, if a pattern of 0,1,1 (a Gray code zero bit pattern) is present at the input of the AND gate 140, its output will be true. This output is compared with the output of the AND gate 132 in a NAND gate 142. If neither a zero found nor a one found is true, then an error condition is present, and this is signaled via an error status condition on a line 144A to the microcontroller 56 via the bus structure 58.

In the event that the Gray coded bit value may be in error, error correction techniques may be employed, as with a parity bit or CRC bit within the Gray coded ID field 106. Or, the B burst amplitude may be read and used during settling, when the head is halfway between two tracks, in accordance with the teachings of the referenced and commonly assigned U.S. Pat. No. 5,170,299, entitled: "Edge Servo for Disk Drive Head Positioner".

Figure 6:
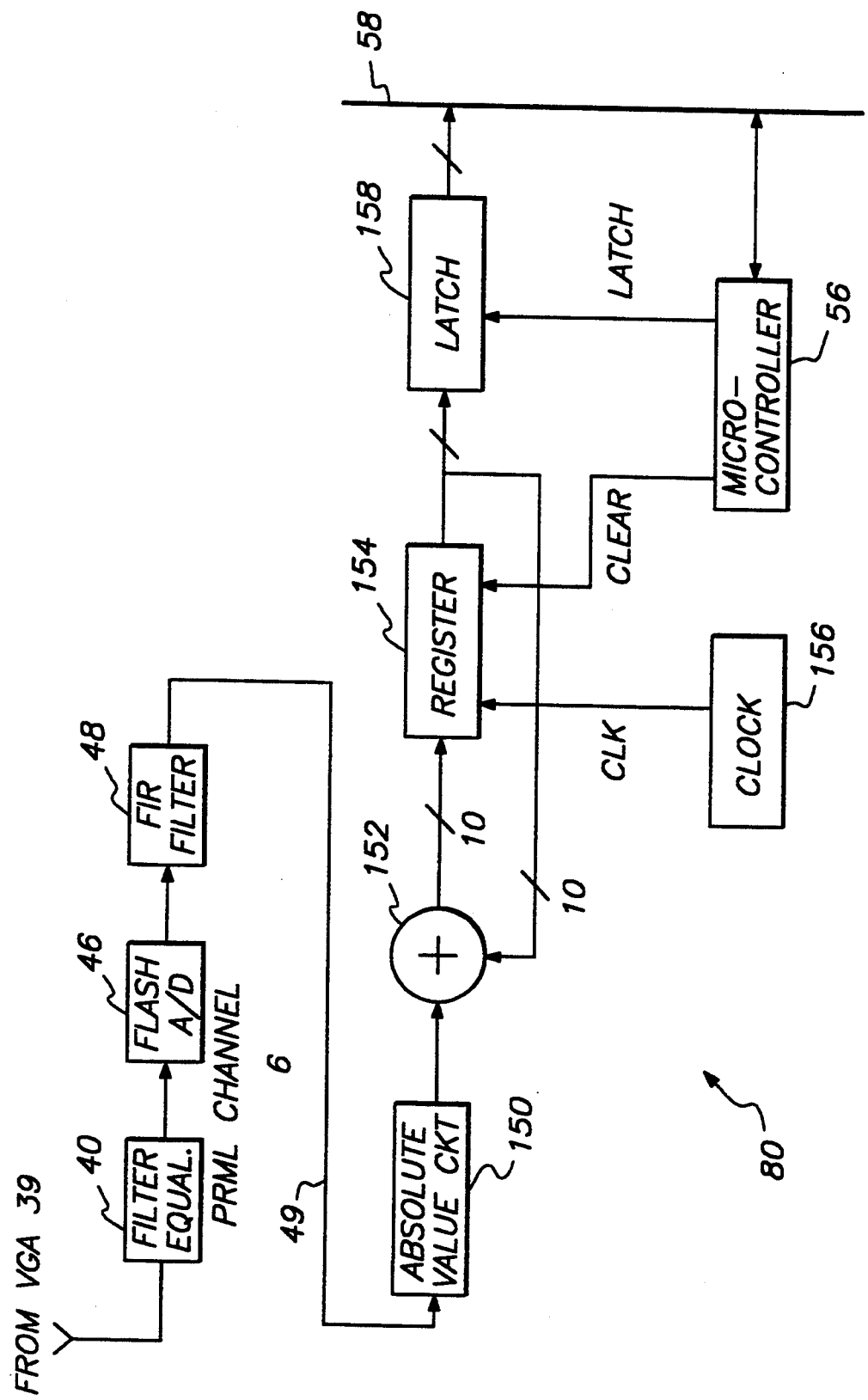
FIG. 6 is a more detailed block diagram illustrating a synchronous burst field amplitude detector in accordance with principles of the present invention.

FIG. 6 illustrates circuitry for implementing the synchronous servo burst amplitude detector 80. It is important to note that the burst field ¼T sine wave patterns are in phase with the AGC/PLL field. Thus, when timing is acquired by the timing loop on the basis of the AGC/PLL field, that same timing applies to decoding of relative amplitudes of each of the servo burst fields 110, 114, and 118. In the event that timing is lost, or becomes marginal during the interval from the AGC/PLL field 102 to the first burst field 110, or between burst fields, it is practical to record small resynchronization patterns between each of the bursts in the spaces 108, 112, 116 and 120 which are otherwise DC erased.

The sampling of the burst field sine waves occurs at approximately 0.707 amplitude on both sides of the peak, both positive and negative. In order to recover an accurate quantization of this amplitude, an absolute value providing circuit 150 strips off the sign of the incoming conditioned quantization values yk from the output of the FIR filter 48. This results in absolute burst quantization values |yk| which are passed to an accumulator 152. The accumulator output is applied to a register 154 which is clocked at the zone cell clocking rate T in accordance with a zone clock 156 which may be part of the synthesizer 61. The microcontroller 56 generates a clear value which clears the register 154 before each burst field. An output from the register 154 is fed back to the accumulator 152 over a path 155. In this way, the accumulator accumulates the six bit absolute quantization values |yk| into ten bit burst amplitude values. The microcontroller 56 signals start and end of each burst amplitude accumulation process by asserting CLEAR to clear the register 154, and by asserting LATCH to latch accumulated burst amplitude into the latch 158. This value is then read by the microcontroller via the bus structure 58.

While the present invention has been described in connection with a data scheme employing data ID fields, as taught by the referenced U.S. Pat. No. 5,255,136, an ID-LESS data format may also be used with equal success, in accordance with the principles taught, for example, by commonly assigned, copending U.S. patent application Ser. No. 08/109,839, filed on Aug. 20, 1993, entitled: "ID-Less Data Sector Format and Data Controller", the disclosure thereof being incorporated herein by reference. In an ID-less approach, the Gray code field 106 may be expanded to include a sector number, as well as a track number.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A method for synchronously decoding head positioning servo information recorded within embedded servo sectors of a hard disk drive including a rotating data storage disk, a data transducer head positionable at concentric data tracks formed on a storage surface of the disk by a head position servo loop, and a synchronous digital data channel connected to the data transducer head for providing plural synchronous digital data samples of each analog magnetic flux transition read from a data storage surface, each embedded servo sector having head positioning servo information including a preamble pattern, a servo address mark, and an interleaved Gray coded track identification field for providing coarse head positioning information, comprising the steps of:

detecting arrival of each embedded servo sector at the data transducer head, synchronizing a timing loop to the preamble pattern to provide a sample clock, controlling timing and phase of an analog to digital conversion means with the sample clock for sampling magnetic flux transitions read from the embedded servo sector being read to provide synchronous digital data samples, passing the synchronous digital data samples through a digital finite impulse response filter to provide conditioned digital data samples, decoding within a synchronous interleave maximum likelihood decoder the conditioned digital data samples into coded data groups, decoding the coded data groups with a post coder into a stream of binary servo data, detecting the servo address mark within the stream of binary servo data with a synchronous servo address mark detector to provide a servo sector clocking signal, resetting a timing means with the servo sector clocking signal, for marking in time the location of the interleaved Gray coded track identification field, and decoding the interleaved Gray coded track identification field within the stream of binary servo data with an interleave Gray code decoder to provide the coarse head positioning information to the head position servo loop for positioning the head.

2. The method set forth in claim 1 wherein a magnetic flux transition pattern providing the servo address mark is selected to have minimized correlation with a synchronization preamble field read just before the servo address mark field, and with the interleaved Gray coded track identification field.

3. The method set forth in claim 2 wherein the magnetic flux transition pattern providing the servo address mark is selected to have a Hamming distance of greater than or equal to five.

4. The method set forth in claim 1 wherein each embedded servo sector also includes a plurality of circumferentially staggered, radially offset, constant frequency servo burst fields for providing fine head position information which are recorded synchronously with the servo address mark and the interleaved Gray coded track identification field, and comprising the further steps of:

removing the sign of conditioned data samples taken of a burst field to provide absolute amplitude samples, accumulating the absolute amplitude samples of the burst field within an accumulator to provide a digital sum, using the digital sum within the head position servo loop as an average of fine head position, in relation to digital sums acquired synchronously from other ones of the servo burst fields.

5. The method set forth in claim 1 wherein the data tracks are arranged into concentric data zones, each data zone having a data transfer rate adapted to disk radius, and wherein each servo sector is recorded to begin at a radial sector line and has a data transfer rate matching a nominal data transfer rate of its zone, and including the additional step of adjusting the timing means to the nominal data transfer rate of the zone as the head passes thereinto during track seeking operations of the disk drive.

6. The method set forth in claim 1 comprising the further step of adjusting a gain control loop for controlling gain of the magnetic flux transitions prior to conversion to synchronous data samples by reference a constant frequency pattern recorded at the beginning of each servo sector.

7. The method set forth in claim 1 comprising the further step of providing a long magnet asynchronous servo address mark pattern at the beginning of at least one of the sectors, and detecting the presence of the long magnet asynchronous servo address mark pattern during an initial disk drive calibration routine.

8. A synchronous servo data detection subsystem for a partial response, maximum likelihood sampled data channel for a hard disk drive including a rotating data disk storage surface defining a multiplicity of concentric data tracks and a plurality of radially extending servo sectors, each servo sector including a servo synchronization field followed by a synchronous servo address mark field defining a unique recording pattern, followed by fields providing the coarse and fine head position information, a data head adjacent to the data storage surface for reading and writing data signals from and to the storage surface, a voice coil actuator structure for positioning the data transducer head at each selected data track, a head position servo loop for controlling movement of the actuator structure, the sampled data channel connected to receive, synchronously sample and decode into digital data the analog signals read by the head during the data reading operations, the synchronous servo data detection subsystem being operative as the data head passes over a said servo sector for sampling and detecting the synchronously recorded coarse and fine head position information and for supplying the detected servo information to the head position servo loop, and comprising:

timing loop means for synchronizing the sampled data channel to the servo synchronization field to provide synchronous samples from the servo sector, a synchronous servo address mark pattern detector connected to an output of the sampled data channel for detecting the unique recording pattern and for thereupon generating a servo address mark found signal, a synchronous coarse head position information detector connected to an output of the sampled data channel responsive to the address mark found signal for detecting and accumulating coarse bits comprising the coarse head position information, and a synchronous fine head position detector connected to the sampled data channel for detecting the fine head position information.

9. The synchronous servo data detection subsystem set forth in claim 8 wherein the concentric data tracks are arranged into concentric data zones, each data zone having a data transfer rate adapted to disk radius, wherein the servo sectors are synchronously recorded at a data transfer rate matching a nominal user data transfer rate of the zone, and wherein the timing loop means adjusts timing to the user data transfer rate of the zone.

10. The synchronous servo data detection subsystem set forth in claim 9 wherein each servo sector begins at a radial servo sector line extending across the zones of the concentric data tracks.

11. The synchronous servo data detection system set forth in claim 8 wherein the sampled data channel includes an automatic gain control loop means for adjusting gain levels of synchronous samples, as well as the timing loop means, and wherein each servo synchronization field comprises an AGC/PLL field enabling gain adjustment by the automatic gain control loop means as well as timing synchronization by the timing loop means.

12. The synchronous servo data detection system set forth in claim 8 wherein the unique recording pattern is selected to have a low correlation to the synchronization field, and to the fields providing coarse and fine head position information.

13. The synchronous servo data detection system set forth in claim 8 wherein the coarse information field comprises a Gray coded track identification field for providing the coarse head position information, and the synchronous coarse head position information detector decodes and accumulates bits comprising a Gray coded track number.

14. The synchronous servo data detection system set forth in claim 8 wherein the synchronous coarse head position information detector is connected to the sampled data channel downstream of an interleave data detector, and wherein the synchronous coarse head position information detector includes a plurality of Gray code interleave decoders, each Gray code interleave decoder for decoding and putting out an interleaved bit comprising the Gray coded track number, and further including accumulating means connected to outputs of the plurality of Gray code interleave decoders for accumulating the interleaved bits into the Gray Coded track number.

15. The synchronous servo data detection system set forth in claim 8 wherein the fine head position information fields of each servo sector comprise a plurality of circumferentially and radially offset constant pattern burst fields, and wherein the synchronous fine head position information detector accumulates absolute value burst amplitude samples to provide an averaged burst amplitude accumulation value for each one of the plurality of the burst fields.

16. The synchronous servo data detection system set forth in claim 8 wherein one of the embedded servo sectors includes a long magnet asynchronous servo address mark pattern, and further comprising asynchronous servo address mark pattern detection means connected to the sampled data channel for detecting the long magnet asynchronous servo address mark pattern.

17. The synchronous servo data detector system set forth in claim 8 wherein all of the embedded servo sectors include a long magnet asynchronous servo address mark pattern and further comprising asynchronous servo address mark pattern detection means connected to the sampled data channel for detecting a said long magnet asynchronous servo address mark during a disk drive recalibration routine.

18. An embedded servo sector pattern for use in a disk drive including a disk rotating at a constant angular velocity, a data transducer head positioned by a servo loop relative to concentric data tracks arranged in a plurality of concentric data zones defined on a surface of the rotating disk, each zone having a data transfer rate adapted to disk radius, and a partial-response, maximum likelihood data channel connected to the data transducer head, the pattern comprising:
   a series of circumferentially spaced apart, radial boundaries marking beginning of a series of embedded servo sectors, each servo sector within each concentric track including:
   a preamble pattern comprising a predetermined number of $\frac{1}{4}T$ magnet patterns recorded at a highest synchronous data transfer rate available within each said zone,
   a servo address mark magnet pattern following the preamble pattern,
   a plural-bit Gray coded track identification magnet pattern, and
   wherein the preamble pattern, the servo address mark pattern and the Gray coded track identification field are detected synchronously during a data reading operation by a maximum likelihood detector of the partial-response, maximum-likelihood data channel during playback from the disk.

19. The embedded servo sector pattern of claim 18 wherein each one of the plural bit Gray coded track identification magnet pattern comprises three non-return-to-zero magnets before partial response precoding by the partial-response, maximum-likelihood data channel.

20. The embedded servo sector pattern of claim 19 wherein the servo address mark pattern is selected to have a maximum Hamming distance relative to the preamble pattern and to the Gray coded track identification field.

21. The embedded servo sector pattern of claim 20 wherein the servo address mark pattern has a Hamming distance which is at least equal to five.

22. The embedded servo sector pattern of claim 18 wherein each servo sector further comprises a plurality of circumferentially staggered, radially offset constant frequency, servo burst magnet fields recorded synchronously with the preamble pattern, for providing fine radial offset head position information.

23. A method for synchronously decoding head positioning servo information recorded within embedded servo sectors of a hard disk drive including a rotating data storage disk, a data transducer head positionable at concentric data tracks formed on a storage surface of the disk by a head position servo loop, and a synchronous digital data channel connected to the data transducer head for providing plural synchronous digital data samples of each analog magnetic flux transition read from a data storage surface, each embedded servo sector defining a series of circumferentially spaced apart, radial boundaries marking beginning of a series of embedded servo sectors, each servo sector within each concentric track including:
   a preamble pattern comprising a predetermined number of $\frac{1}{4}T$ magnet patterns recorded at a highest synchronous data transfer rate available within each said zone,
   a servo address mark magnet pattern following the preamble pattern,
   a plural-bit Gray coded track identification magnet interleave pattern, the method for synchronously decoding the head positioning servo information comprising the steps of:
   detecting arrival of each embedded servo sector at the data transducer head,
   synchronizing a timing loop to the preamble pattern to provide a sample clock,
   controlling timing and phase of an analog to digital conversion means with the sample clock for sampling magnetic flux transitions read from the embedded servo sector being read to provide synchronous digital data samples,
   passing the synchronous digital data samples through a digital finite impulse response filter to provide conditioned digital data samples,
   decoding within a synchronous interleave maximum likelihood decoder the conditioned digital data samples into coded data groups,
   decoding the coded data groups with a post coder into a stream of binary servo data,
   detecting the servo address mark magnet pattern within the stream of binary servo data with a synchronous servo address mark detector to provide a servo sector clocking signal,
   resetting a timing means with the servo sector clocking signal, for marking in time the location of the Gray coded track identification magnet interleave pattern, and
   decoding the Gray coded track identification magnet interleave pattern within the stream of binary servo data with an interleave Gray code decoder to provide the coarse head positioning information to the head position servo loop for positioning the head.

* * * * *